(12) United States Patent
Dombrowski et al.

(10) Patent No.: US 7,125,084 B2
(45) Date of Patent: Oct. 24, 2006

(54) ENVIRONMENT PROTECTOR-PRESSURIZED WHEEL HUB

(75) Inventors: Henry Dombrowski, Boynton Beach, FL (US); Anthony Cunningham, Tequesta, FL (US)

(73) Assignee: Air Tight, Jupiter, FL (US)

( * ) Notice: Subject to any disclaimer, the term of this patent is extended or adjusted under 35 U.S.C. 154(b) by 0 days.

(21) Appl. No.: 10/376,756

(22) Filed: Feb. 28, 2003

(65) Prior Publication Data

US 2004/0169417 A1    Sep. 2, 2004

(51) Int. Cl.
B60B 27/00    (2006.01)
F16C 33/76    (2006.01)

(52) U.S. Cl. ............... 301/108.1; 301/108.4; 384/489

(58) Field of Classification Search ............ 301/105.1, 301/108.1–108.5; 384/189, 190.6, 190.7; 152/427, 429, 431, 415, 418, 428; 137/277, 137/232, 223, 227, 224, 230; 73/146.2; 277/345, 406, 500, 585, 907
See application file for complete search history.

(56) References Cited

U.S. PATENT DOCUMENTS

| | | | |
|---|---|---|---|
| 2,612,931 A * | 10/1952 | Orlicki, Jr. ................ 152/415 |
| 3,064,982 A * | 11/1962 | Stephens .................... 277/402 |
| 3,077,948 A | 2/1963 | Law |
| 3,122,374 A * | 2/1964 | McGahan .................... 277/400 |
| 3,169,809 A * | 2/1965 | Pendleton ................... 152/429 |
| 3,226,162 A * | 12/1965 | Eberle ...................... 301/108.1 |
| 3,330,563 A | 7/1967 | Puydt et al. |
| 3,460,874 A * | 8/1969 | Johnson ..................... 384/489 |
| 3,649,080 A * | 3/1972 | Molinare ................ 301/108.1 |
| 3,719,159 A * | 3/1973 | Davis ....................... 116/34 R |
| 3,785,706 A | 1/1974 | Vangalis |
| 3,955,852 A | 5/1976 | De Puydt et al. |
| 4,106,816 A | 8/1978 | August |
| 4,172,620 A * | 10/1979 | Marti ......................... 384/474 |
| 4,190,133 A | 2/1980 | Ploeger |
| 4,262,978 A * | 4/1981 | Everett ....................... 384/132 |
| 4,310,014 A * | 1/1982 | Parker ........................ 137/227 |
| 4,324,114 A * | 4/1982 | Durham ...................... 464/131 |
| 4,489,988 A | 12/1984 | Robbins |
| 4,557,526 A | 12/1985 | Smith |
| 4,924,697 A * | 5/1990 | Hunt et al. ................ 73/146.8 |
| 5,024,345 A | 6/1991 | Deweerdt |
| 5,054,511 A * | 10/1991 | Tuan et al. ................. 137/224 |
| 5,054,859 A * | 10/1991 | Goettker .................. 301/108.1 |
| 5,098,168 A | 3/1992 | Johnson |
| 5,192,117 A * | 3/1993 | Kuck ....................... 301/108.1 |
| 5,328,005 A * | 7/1994 | Van Breemen ........ 188/322.21 |
| 5,482,358 A | 1/1996 | Kuck |
| 5,492,393 A | 2/1996 | Peisker et al. |
| 5,591,281 A | 1/1997 | Loewe |

(Continued)

*Primary Examiner*—Jason R. Bellinger
(74) *Attorney, Agent, or Firm*—McHale & Slavin, P.A.

(57) ABSTRACT

A hub cap for a wheel hub having a cylindrical housing with a closed first end and an open second end adapted for attachment in an air-tight sealing arrangement to the outer end of a wheel hub to form a closed air system in the interior of the wheel hub. An air pressure gauge in an air flow connection with the closed air system is operable to provide a visual indication of the air pressure in the closed air system. The air pressure gauge includes a dial face and a pressure indicating needle moving relative to the dial face in direct relation to the air pressure within the closed air system. The dial face includes indicia thereon to assist an observer to readily identify a breached seal condition within the wheel hub.

11 Claims, 6 Drawing Sheets

U.S. PATENT DOCUMENTS

| | | | |
|---|---|---|---|
| 5,709,389 A * | 1/1998 | Algers et al. | 277/500 |
| 5,785,390 A | 7/1998 | Gold et al. | |
| 5,979,232 A * | 11/1999 | Halcomb | 73/146.8 |
| 5,983,728 A * | 11/1999 | Weng | 73/744 |
| 6,024,417 A | 2/2000 | Jones, II et al. | |
| 6,123,175 A | 9/2000 | Fett | |
| 6,260,595 B1 * | 7/2001 | Cobb | 152/417 |
| 6,325,463 B1 | 12/2001 | Sitter et al. | |
| 6,488,342 B1 * | 12/2002 | De Paiva | 301/108.1 |
| 6,758,531 B1 * | 7/2004 | Bullard | 301/37.21 |
| 6,782,740 B1 * | 8/2004 | Wallach | 73/146 |
| 2002/0139288 A1 * | 10/2002 | Evans et al. | 116/34 R |
| 2003/0024463 A1 * | 2/2003 | Evans et al. | 116/34 R |
| 2004/0160115 A1 * | 8/2004 | Allsop | 301/108.1 |
| 2004/0169416 A1 * | 9/2004 | Dombroski et al. | 301/105.1 |

* cited by examiner

ENVIRONMENT PROTECTOR-PRESSURIZED WHEEL HUB

FIELD OF THE INVENTION

This invention is related to the field of wheel hubs and, in particular, to a apparatus that permits the pressurization of a wheel hub to indicate hub seal integrity.

BACKGROUND OF THE INVENTION

Wheel hubs for use in coupling a tire to a vehicle axle are well known. By way of illustration, a conventional boat trailer utilizes a fixed axle secured to a trailer frame. A wheel assembly is coupled to the axle by use of a wheel hub. The wheel hub employs a bearing assembly to allow free rotation of the hub in relation to the axle. Thus, the wheel assembly, which includes the tire, permits transportation of the boat trailer over a road when trailered by an automobile. The conventional wheel hub employs bearings, namely an inner and outer bearings with an associated inner and outer race, which permits rotational movement in relation to the axle.

As with any friction producing components, it is imperative that the bearings are lubricated in order to prevent premature wear. Typically, a bearing grease is used which liquefies during bearing rotation for use in lubricating the bearings. The grease is sealed within the hub by use of an oil seal positioned along an inner side surface of the hub, and a bearing cap positioned along an outer side surface of the hub. The seals are used to prevent liquified grease from escaping the hub joint.

Thus the integrity of the oil seal and hub cover is critical to prevent loss of grease. Absence of a lubricant can quickly lead to catastrophic failure of the bearings causing hub disengagement of the axle, which can result in wheel assembly loss and the associated dangerous scenario of property and possibly life endangerment. For instance, a trailer carrying a heavy load such as a 25 foot boat, will quickly heat up a bearing that is not properly lubricated. Should the bearing fail, the bearing and race will typically disintegrate with a likely result of the hub and wheel detaching from the axle of the trailer. Boat trailers present an excellent example of premature wear as a boat trailer is typically inserted into water for loading or unloading of the boat. Should there be a failure of the hub seal, water is allowed to enter the hub resulting in the premature wear. In addition, should the water be saltwater, bearing disintegration is greatly enhanced since rust forming on the bearing surfaces will operate to destroy the bearings with very short use.

In light of the above numerous attempts have been made in order to prevent loss of bearing lubricant Many prior art wheel hub devices maintain pressurized grease within the hub. A very successful system consists of a modified hub cap having a grease fitting with a spring which visually indicates that grease has been inserted into the hub. However, should the hub seal fail, the assembly will actually facilitate grease being pushed through the seal. Should the spring jam, even if the bearing indicator illustrate that grease is prevalent in the seal, it may be providing a false indication. In addition, a slow leak will allow grease to be inserted into the hub and upon liquification during operation the seal could allow the liquified grease to easily escape.

Unfortunately, a spring loaded system to pressurize grease into the hub results in an excess amount of grease injected into the hub for proper operation. This results in an obvious waste of grease for only the bearing rollers must be lubricated. Thus, the amount of grease necessary is simply a coating over the bearing rollers. The spring loaded system advocates that should a seal leak, the user need simply pump more grease into the wheel hub on a continuous basis. Of course, the grease continues to leak from the wheel hub because the breach in the seal remains. For instance, a person may check a hub and insert grease into the hub before taking the trailer on the road. Once the trailer reaches operating speed, the liquified grease may easily escape. Should the operator back trailer into a lake, for purposes of unloading a boat, grease that has escaped from the hub and remains on the trailer will be exposed to the water.

Prior art patents directed to wheel bearing lubricators teach that the release of grease into the water is advantageous. Vangalis, U.S. Pat. No. 3,785,706, discloses a hub cap of transparent plastic which is closed at the outer end and contains a spring-backed piston for applying pressure on lubricant grease in the hub cap for yielding when the lubricant expands. The hub cap has two small vents, one for permitting lubricant to escape when expansion is excessive and the other to vent the enclosed portion of the hub behind the piston to atmospheric pressure.

Ploeger, U.S. Pat. No. 4,190,133, discloses a wheel bearing pressure lubricator for hubs subject to periodic submersion in water. The device includes a piston for relieving excess lubricant pressure and a piston position indicator providing a visual indication when the piston is in hub filled position and when the piston is in a no pressure position at which the piston ceases to apply pressure to the lubricant in the hub.

The adverse environmental impact of petroleum product contamination of natural water environments is well known. The constant expulsion of grease into natural waters by the prior art bearing lubrication systems will have a cumulative negative impact on the environment. In the year 2001, the National Marine Manufacturers Association estimated that 7,564,900 boat trailers were in operation, a significant number of which are continuously expelling grease into natural waters. Should the water be a reservoir for drinking water, even a few drops of oil can result in system contamination. However, it is well known that any oil in water has an adverse effect to wildlife.

Total estimated retail expenditures on boating totaled $25,593,409,000 in 2001. Recreational boating in the United States is an ever-growing industry, a trend which is increasingly at odds with environmental concerns. The continued water pollution by leaking wheel hubs is unnecessary and preventable, and that there remains a need for an "environmentally friendly" system of bearing maintenance.

Thus, what is lacking in the art is a positive indication of hub and oil seal integrity to indicate availability of bearing grease within the hub which does not release grease into the environment.

SUMMARY OF THE INVENTION

In light of the above, the applicants propose a wheel hub assembly capable of providing an air-tight seal. The assembly includes a visual indicator of air pressure within the hub for use in monitoring oil seal integrity. A pressure gauge mounted to a hub cap is joined with a air insertion valve allowing air insertion by use of conventional tire inflation.

It is an objective of the instant invention to provide a visual indicator of oil seal integrity of hub assemblies.

Still another objective of the instant invention is to provide a visual indicator that operates before grease liquidisation, during grease liquidisation, and after grease liquidisation of the grease providing a positive indication that wheel bearing grease has not escaped the hub.

Still another objective of the instant invention is to provide an indicator for law enforcement that hub integrity is intact before allowing trailer placement within a body of water thereby preventing a leaking hub from contamination of water with oil byproducts.

Yet still another objective of the instant invention is to provide a positive pressure within the hub at all times to prevent the entrance of particles within the hub including water, to prevent premature destruction of the wheel bearing assemblies.

It is a further objective of the instant invention to provide a hub cap designed to protect wheel bearing assemblies which does not harm natural water environments by facilitating grease expulsion, thereby representing an improvement over the prior art devices.

In accordance with the above objectives, a pressurized wheel hub is provided which comprises a wheel hub having bearings that are rotatably securable to an axle; seals between the wheel hub and the axle, the seals forming a closed air space around the bearings; and a valve for insertion of pressurized air into the closed air space. The pressurized wheel hub includes a means for measuring the amount of pressurized air placed within closed air space hub cap for a wheel hub.

The hub cap comprises a cylindrical housing having a closed first end and an open second end, the open second being adapted for attachment in an air-tight sealing arrangement to the outer end of a wheel hub to form a closed air system in the interior of the wheel hub; an air valve in an air flow connection with the closed air system for receiving pressurized air; and an air pressure gauge in an air flow connection with the closed air system operable to provide a visual indication of the air pressure in the closed air system whereby a breached seal condition within the wheel hub can be detected. The second end is formed with a flange and an outer annular shoulder wherein the flange is adapted to be fit into the outer end of a wheel hub with an airtight seal. The hub cap can be adapted for threaded engagement with the wheel hub or can be press fit. The outer annular shoulder includes a circumferential recess and an O-ring is disposed in the recess to provide an effective air tight seal.

The air pressure gauge includes a dial face and a pressure indicating needle moving relative to the dial face in direct relation to the air pressure within the closed air system. The dial face includes indicia thereon to assist an observer to readily identify a breached seal condition within the wheel hub.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
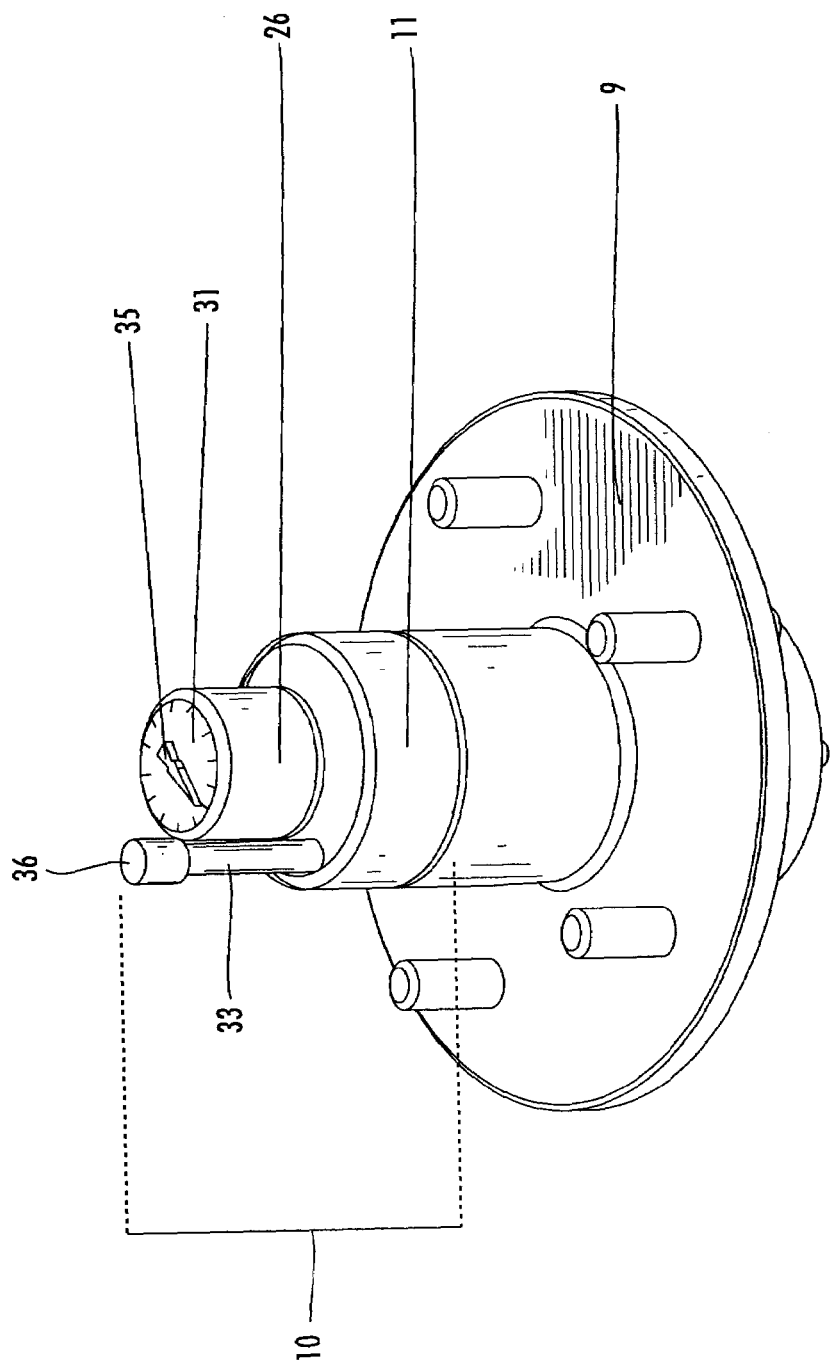
FIG. 1 is a perspective view of a hub cap according to a preferred embodiment of the invention as installed on a trailer wheel hub.
Figure 2:
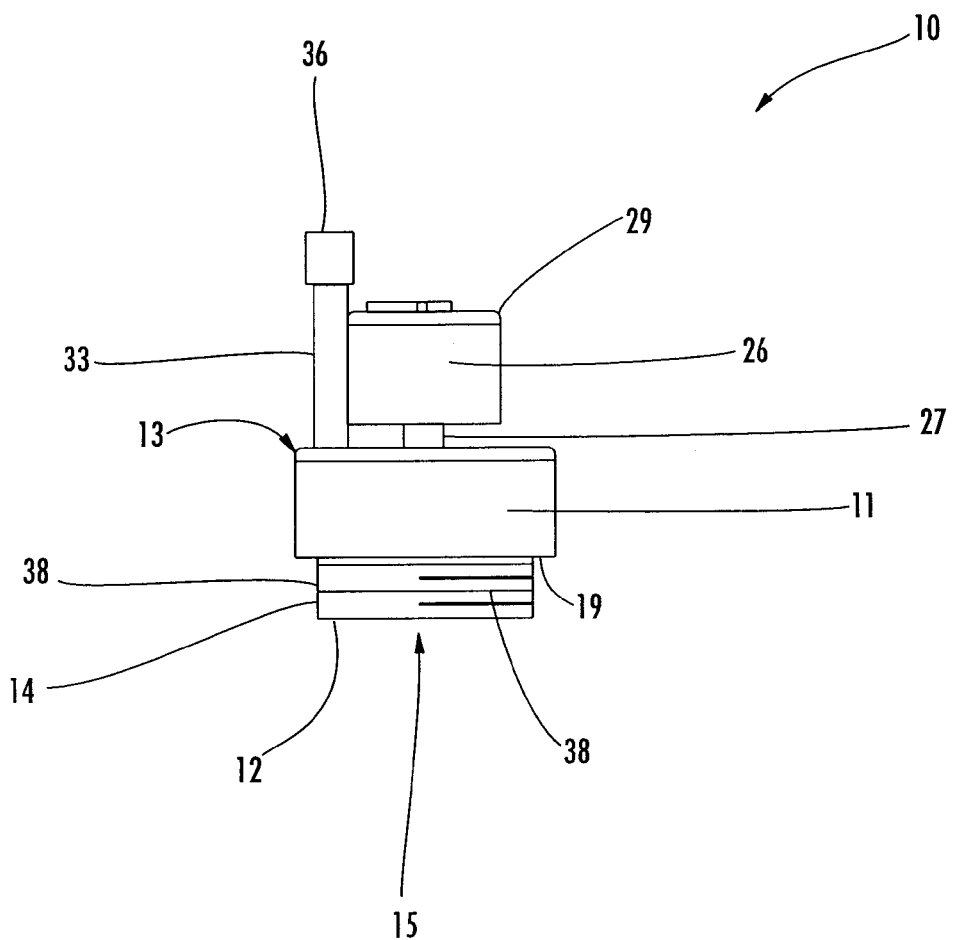
FIG. 2 is a side view of the hub cap of FIG. 1.
Figure 3:
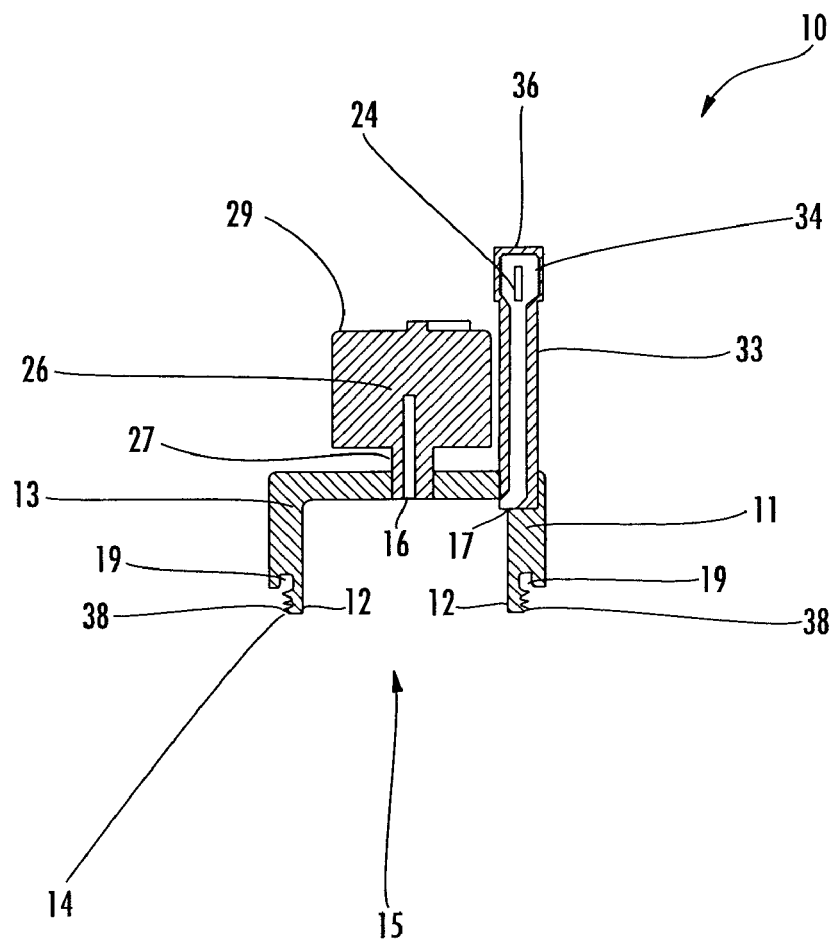
FIG. 3 is a cross-sectional view of the hub cap of FIG. 1.
Figure 4:
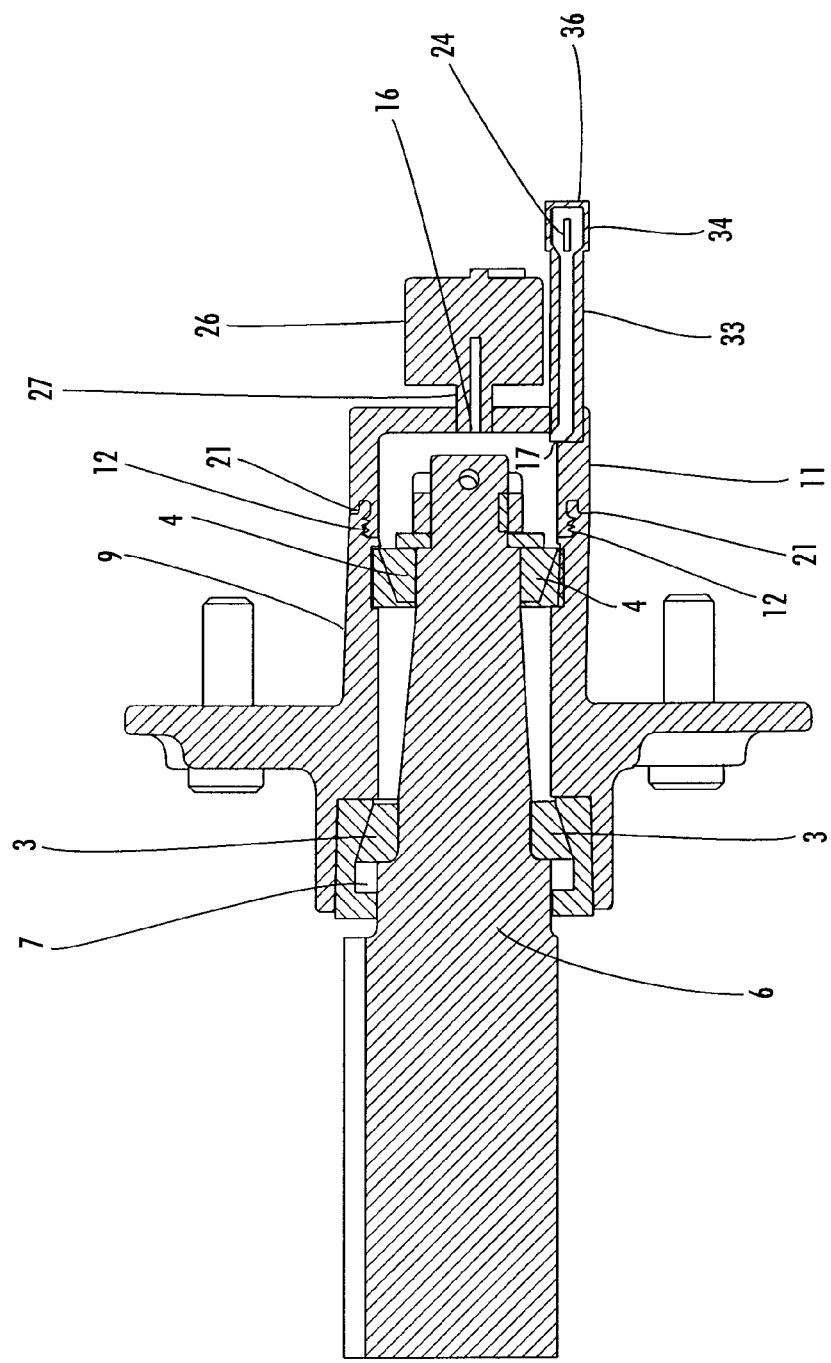
FIG. 4 is a cross-sectional view of the hub cap of FIG. 1 installed on a wheel hub and axle assembly.

A hub cap 10 according to a preferred embodiment of the invention is shown in FIGS. 1–3. FIG. 1 illustrates the hub cap 10 as installed to the wheel hub 9 of a boat trailer wheel. FIG. 4 is a cross-sectional view of the hub cap 10 as assembled with a hub 9 of an axle and wheel unit 8 for a boat trailer. The hub 9 is rotatably supported on bearing assemblies 3 and 4 and mounted on an axle 6. A seal 7 adjacent the inner bearing 3 seals the end of the chamber 8 within the hub 9.

As is best seen in FIGS. 2 and 3, the hub cap 10 of the invention includes a cylindrical housing 11 having a closed first end 13 and an open second end 15. The second end 15 is formed with a flange 12 and an outer annular shoulder 14 which enable the hub cap 10 to be inserted into the outer end of the wheel hub 9 so as to constitute an extension of the wheel hub 9. The flange 12 fits tightly enough within the wheel hub 9 fits so as to create an approximately air tight seal. In the preferred embodiment, the outer end of the wheel hub 9 is formed with threads 28 on the inside surface (FIG. 5), and the outer surface of flange 12 is formed with threads 38 adapted to engage with threads 28. In an alternative arrangement shown in FIG. 6, the flange 12 can be formed without the threads 38 so that it can be press fit into wheel hub 9. The annular shoulder 14 includes a circumferential recess 19 therein which receives a rubber O-ring. 21 (FIG. 4) so that a fully air tight seal can be achieved, thus creating a closed air system within the wheel hub 9. The wheel hub 9 includes a means for insertion of pressurized air into the wheel hub. The means for insertion of pressurized air can be a standard tire air valve stem installed in the wheel hub 9. As can be seen in FIGS. 3 and 4, an air valve 24 for receiving pressurized air extends from the cylindrical housing 11. The air valve 24 is in an air flow connection with the closed air system within the hub cap 10. A conventional air pressure gauge 26 in an air flow connection with the closed air system is operable to provide a visual indication of the air pressure within the wheel hub 9. The air pressure gauge 26 enables an observer to immediately detect a breached seal condition within the wheel hub by the resultant loss of air pressure within the wheel hub 9.

The air pressure gauge 26 can have a cup shaped housing 29 having a conduit 27 extending therefrom providing a passage to the internal chamber of air pressure gauge 26. In the preferred embodiment, the closed end of the hub cap housing 11 can include a through bore 16 for receiving the conduit 27, which is fixedly secured therein to provide an air flow coupling between the air pressure gauge 26 and the wheel hub 9. As can be seen in FIG. 1, the air pressure gauge 26 is of a conventional design, and includes a dial in the form of an annular disk 31 having the standard indicia 33 thereon in the form of radial graduations. A pressure indicating needle 35 moves relative to the annular disk 31 in direct relation to the air pressure within the wheel hub 9. The disk 31 can also include alphanumeric indicia specific to the function of the present invention corresponding to the position of pressure indicator needle 35. For example, the disk 31 can indicate an optimum air pressure fill level, and can include color coded regions to alert observers that the seal has been breached.

The air valve 24 is a conventional valve stem of any operable construction as would commonly be utilized to inflate automobile tires and the like. The air valve 24 is housed in cylindrical metal tube 33 which is seated in a through bore 17 in the housing 11. The distal end of the tube 33 includes threads 34 which engage with an conventional tire inflation device, and which also engage with the cap 36. As is the conventional construction, a spring-loaded axially disposed post is contained in the air valve 24 which is depressed by attachment of a inflation device to threads 34.

Figure 5:
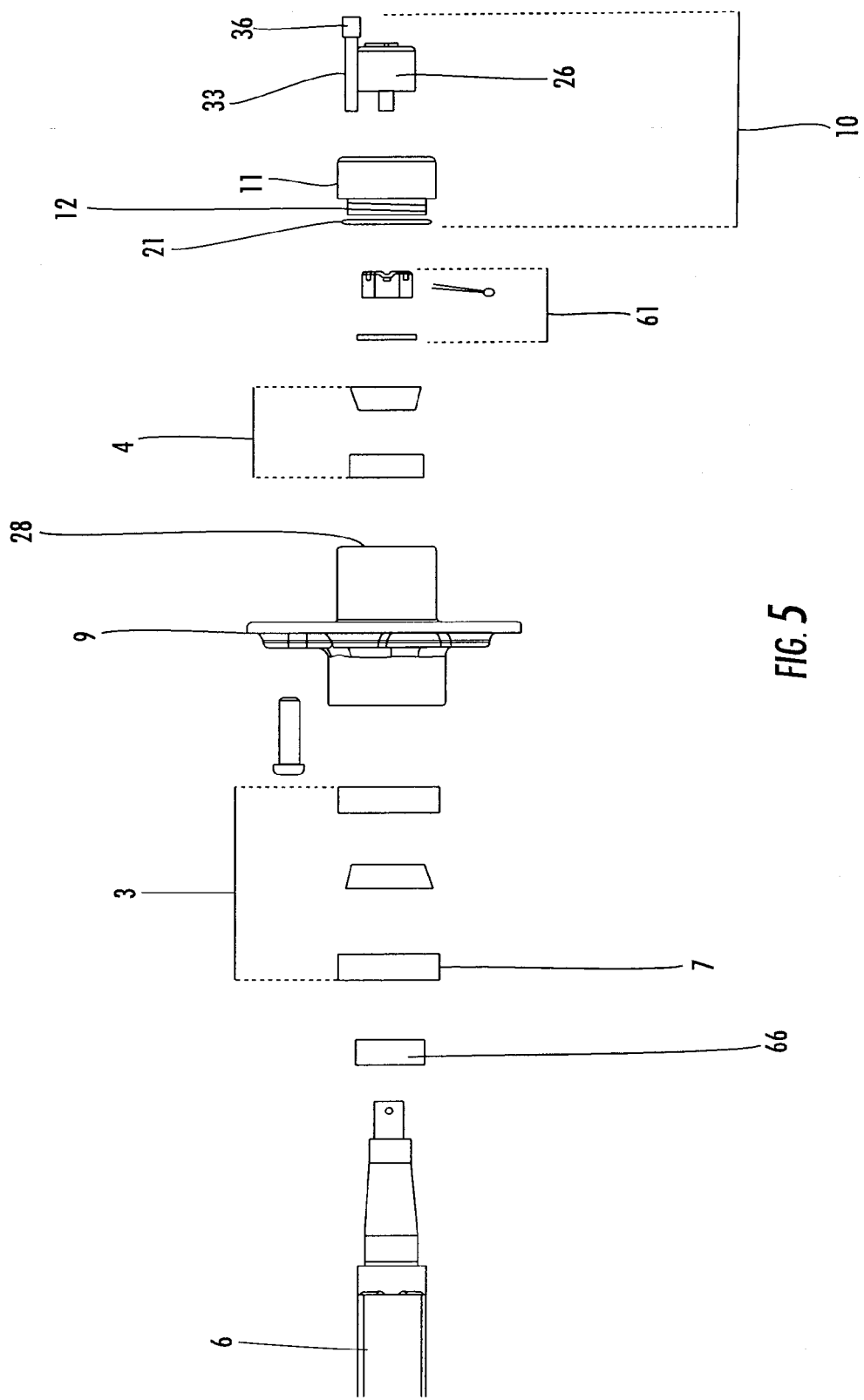
FIG. 5 is an exploded by of the hub cap of FIG. 1 installed on a wheel hub and axle assembly.
Figure 6:
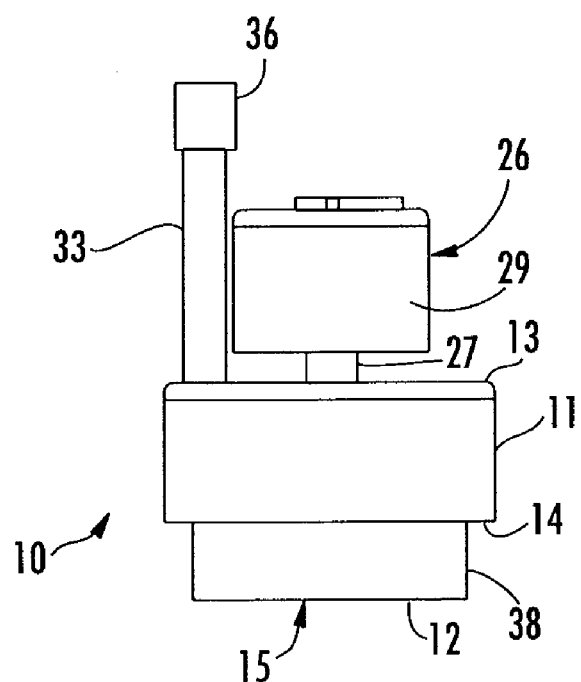
FIG. 6 is a side view of the hub cap of FIG. 1 which is adapted to be press fit into a wheel hub.

FIG. 5 is an exploded illustration of the hub cap 10 and wheel and axle and wheel assembly 8. As is the conventional mode of assembly, the axle 6 is concentrically coupled to bearing assembly 3 , the wheel hub 9, and bearing assembly 4, and secured by washer and nut assembly 61. The hub cap 10 of the invention is attached to the wheel hub 9 in the manner previously described. In order to provide an improved air tight seal at the point of connection of the bearing assembly 3 and the axle 6, the system of the invention can further include the inclusion of a polished sleeve 66 between the bearing assembly 3 and the axle. For instance, should an existing axle be reworked to accommodate the instant invention, the use of a sleeve can be sealingly secured to the axle to provide a smooth surface for the oil seal. The greatest wear problem for the oil seal is the poor surface preparation of the axle that results in premature failure of the oil seal. The use of a sleeve on used axles provides extended oil seal life. In addition, poor manufacturing of an axle can also be rectified by the sleeve.

In use, the installed hub cap 10 is initially receives air from a pressurized air source through the air valve 24 until the air pressure is approximately 1–30 psi, which can be accomplished using any conventional air source. Typically the air can be received from an air pump, alternatively, a jumper hose can also be transfer air from a trailer tires to the hub. If an air pressure of 1–30 psi cannot be achieved, this would be indicative of a broken seal within the wheel hub 9.

The present invention advantageously allows the user (or a law enforcement official) to quickly visually inspect each trailer wheel to determine the integrity of the seals within the wheel hub. If the pressure is maintained within a wheel hub, the seals are sound, and the trailer wheels can be safely submerged without danger of water damage. When a loss in air pressure is observed, it is an indication that repairs to restore the integrity of the seals must be completed before the trailer can be used in water. While the prior art devices also provide a visual indication of broken seals, they do not require repairs in order to continue use of the trailer, but instead allow the user to temporality remedy the situation by pumping grease into the wheel hub to stop water penetration by maintaining the grease under pressure. Since the leak has not been actually been repaired, the pressurized grease continues to be ejected into the water when the prior art devices are used. In contrast, the system of the present invention requires the repair of hub leaks, and does not continuously pollute the waters in which the trailer is deployed.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings. The instant invention can be used on automobile and truck axles including CV joints, or on any other coupling where integrity of the bearing housing is critical. It should be noted that proper seals prevents road grit or other contaminants from entering the bearing housing thereby enhancing bearing life.

What is claimed is:

1. An improved hub cap for insertion of pressurized air into a conventional wheel hub rotatably mounted on the end of a vehicle axle, said improved hub cap consisting of: a first seal adapted to encircle said axle and form an air-tight seal with said wheel hub, a housing adapted for attachment to an outer end of said conventional wheel hub, said housing including a second seal, said first seal and said second seal providing an air-tight sealing arrangement forming a closed air space in the interior of the wheel hub, said housing including a valve for insertion of pressurized air into said closed air space, whereby a constant air pressurization is maintained in said closed air space, and a pressure gauge to provide a visual indication of the pressurized air whereby a breached seal condition within the wheel hub can be detected.

2. The hub cap of claim 1, wherein said air pressure gauge includes a dial face and a pressure indicating needle moving relative to said dial face in direct relation to the air pressure within said closed system.

3. The hub cap of claim 1, wherein said pressurized air is about 1–30 psi.

4. The hub cap of claim 1, wherein said hub cap is formed with a flange and an outer annular shoulder and said flange is adapted to fit within the outer end of a wheel hub.

5. The hub cap of claim 4, wherein said flange includes threads adapted for enqagement with mated threads on the inside surface of a wheel hub.

6. The hub cap of claim 4, wherein said flange is adapted to be press fit into the outer end of a wheel hub.

7. The hub cap of claim 4, wherein said outer annular shoulder includes a circumferential recess and an O-ring disposed in said recess.

8. The hub cap of claim 1, wherein a first end includes a through bore and said valve for inserting pressurized air is housed in a cylindrical metal tube seated in said through bore.

9. A method of pressurizing a wheel hub and visually depicting wheel hub integrity consisting of: placing a sleeve on an axle;

mounting a wheel hub on said axle to form an air-tight seal with said sleeve;

placing a hub cap having a cylindrical housing with a closed first end and art open second end on said wheel hub, the open second end adapted for attachment in an air-tight sealing arrangement to the outer end of a said wheel hub forming a closed air system in the interior of the wheel hub;

providing an air valve for insertion of pressurized air into said closed air system;

insertion of pressurized air into satd closed air system, whereby a constant air pressurization is maintained in said closed air system; and securing an air pressure gauge in an air flow connection with the closed air system, said air pressure gauge providing visual indication of the pressurized air in the closed air system whereby a breached seal condition within the wheel hub is indicated by a loss of air pressure.

10. The method of claim 9, wherein annular threads are formed on said wheel hub;

said second end includes a threaded flange adapted for engagement with said threaded wheel hub; and threading said hub cap on said wheel hub.

11. The hub cap of claim 1, wherein said first seal is a sleeve of a size and shape to form an air-tight seal between said axle and said wheel hub.

* * * * *